(12) United States Patent
Geiser

(10) Patent No.: US 7,413,162 B2
(45) Date of Patent: Aug. 19, 2008

(54) VACUUM VALVE

(75) Inventor: Friedrich Geiser, Nueziders (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 11/693,257

(22) Filed: Mar. 29, 2007

(65) Prior Publication Data

US 2007/0228314 A1 Oct. 4, 2007

(30) Foreign Application Priority Data

Mar. 31, 2006 (AT) ............................... A 559/2006

(51) Int. Cl.
*F16K 31/12* (2006.01)
(52) U.S. Cl. .................... 251/175; 251/193; 251/301
(58) Field of Classification Search ................. 251/175, 251/193–202, 298, 301–302
See application file for complete search history.

(56) References Cited

U.S. PATENT DOCUMENTS

| | | | | |
|---|---|---|---|---|
| 3,343,562 A * | 9/1967 | Combes | ...................... | 251/175 |
| 3,524,467 A * | 8/1970 | Worley | ........................ | 251/175 |
| 4,157,169 A * | 6/1979 | Norman | ..................... | 251/195 |
| 4,343,455 A * | 8/1982 | Winkler | ...................... | 251/175 |
| 4,381,100 A * | 4/1983 | Schoenberg | ................ | 251/302 |
| 5,087,017 A * | 2/1992 | Sawa et al. | .................. | 251/175 |
| 6,056,266 A * | 5/2000 | Blecha | ........................ | 251/175 |
| 6,079,693 A * | 6/2000 | Ettinger et al. | .............. | 251/195 |
| 6,409,149 B1 * | 6/2002 | Maher, Jr. | ................... | 251/301 |
| 6,561,482 B2 | 5/2003 | Okii | | |
| 6,561,484 B2 * | 5/2003 | Nakagawa et al. | .......... | 251/175 |
| 6,776,394 B2 | 8/2004 | Licas | | |
| 7,270,311 B1 * | 9/2007 | Brenes | ........................ | 251/175 |
| 2004/0079915 A1 | 4/2004 | Contin et al. | | |
| 2004/0245489 A1 * | 12/2004 | Kurita et al. | ................ | 251/195 |

FOREIGN PATENT DOCUMENTS

| | | |
|---|---|---|
| DE | 2 013 420 | 1/1972 |
| DE | 26 39 198 | 3/1973 |
| JP | 62-199971 | 9/1987 |
| JP | 63-076954 | 4/1988 |

* cited by examiner

*Primary Examiner*—John Bastianelli
(74) *Attorney, Agent, or Firm*—Reed Smith LLP

(57) ABSTRACT

A vacuum valve comprises a valve housing which has an inlet opening and an outlet opening, a valve disk which is located in the interior space of the valve housing and which is arranged at a carrying arm that is rigidly connected to a shaft which, for purposes of opening and closing the vacuum valve, is rotatable around its longitudinal axis and displaceable in axial direction, and a driving device for opening and closing the vacuum valve. The driving device comprises a rotary drive for rotating the shaft. The driving device further comprises a driving piston which is arranged in an inner cavity of the valve disk and which has, at least over portions of its circumference, a radial extension which is larger than the outlet opening with respect to the center longitudinal axis of the outlet opening and at which tappets are arranged on the side facing the outlet opening. The tappets are guided out of the inner cavity of the valve disk and are supported in the closed position of the valve disk at the valve housing in the area next to the outlet opening and press the valve disk against the valve seat and can be lifted from the valve housing for displacing the valve disk from its closed position into its intermediate position by means of a displacement of the driving piston. At least one spring element displaces the valve disk into its intermediate position by an axial displacement of the shaft.

9 Claims, 3 Drawing Sheets

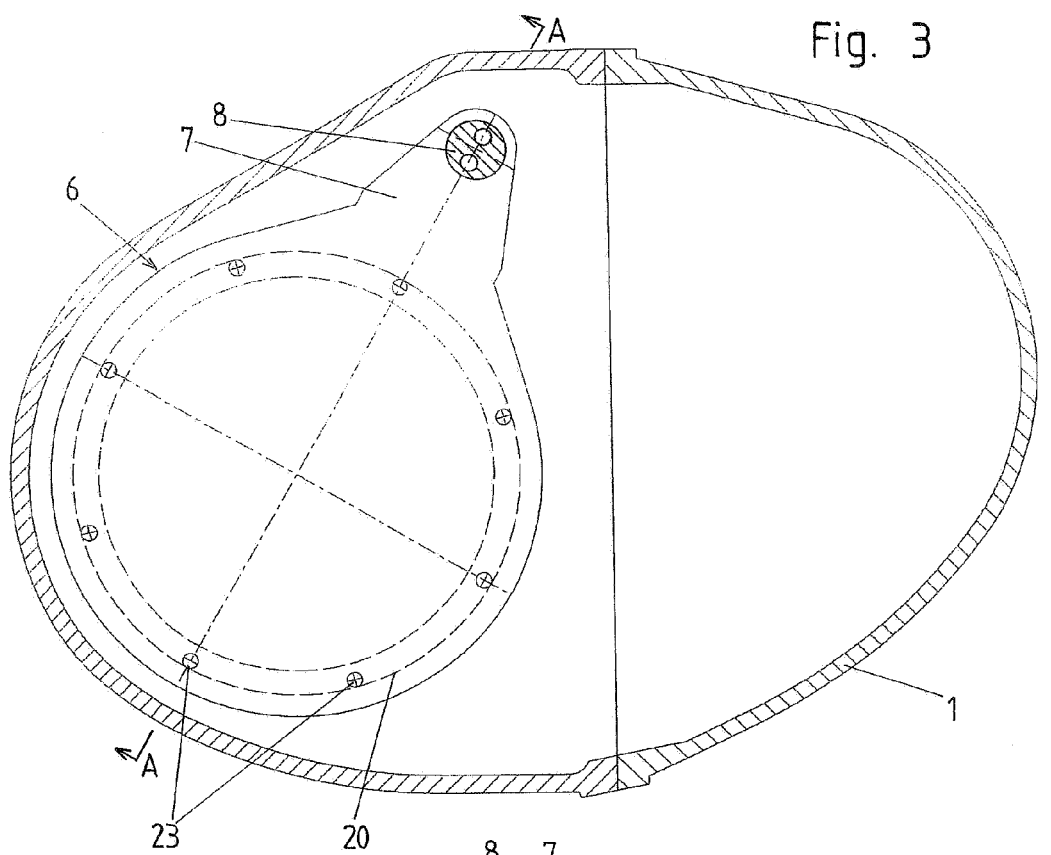
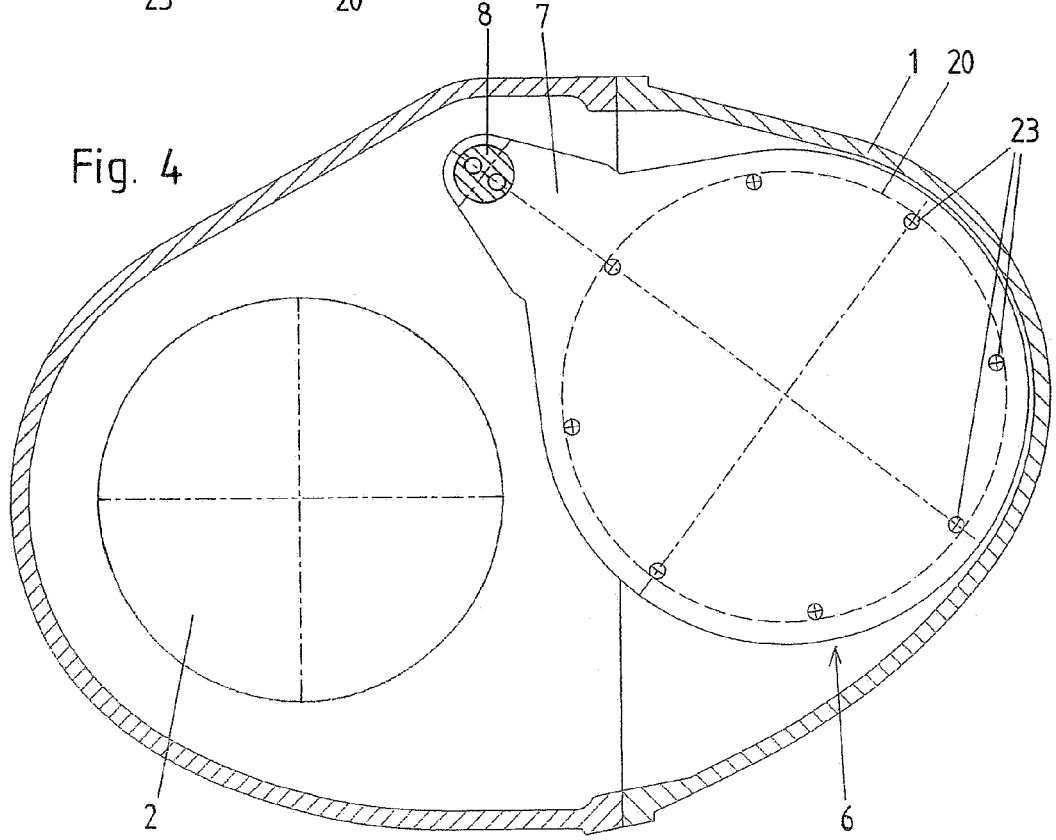

VACUUM VALVE

CROSS-REFERENCE TO RELATED APPLICATION

This application claims priority of Austrian Application No. A 559/2006, filed Mar. 31, 2006, the complete disclosure of which is hereby incorporated by reference.

BACKGROUND OF THE INVENTION a) Field of the Invention

The invention is directed to a vacuum valve comprising a valve housing which has an inlet opening and an outlet opening penetrating opposite walls of the valve housing, a valve seat surrounding the inlet opening, a valve disk which is located in the interior space of the valve housing and is arranged on a carrying arm that is rigidly connected to a shaft which, for purposes of opening and closing the vacuum valve, is rotatable around its longitudinal axis and displaceable in axial direction, and a driving device by which the valve disk can be adjusted from a closed position, in which it is pressed against the valve seat, by way of an intermediate position, in which it is lifted from the valve seat, into an open position in which it releases the inlet opening by an axial displacement of the shaft, and the driving device comprises a rotary drive for rotating the shaft.

b) Description of the Related Art

Vacuum valves of the type mentioned above are also called pendulum valves and are known in various embodiment forms. A pendulum valve of this type is known, for example, from U.S. Pat. No. 6,776,394 B2. The rotatable sleeve which is displaceable in axial direction and at which the carrying arm carrying the valve disk is arranged is connected to the valve housing by a linked guide and an external thread of a shaft is screwed into an internal thread of the sleeve extending in axial direction of the sleeve. By rotating the shaft, the sleeve, in cooperation with the linkage guide, is displaced in axial direction and rotated so as to open and close the valve. Further, pistons are arranged in the cylinder spaces of the valve housing which lie around the outlet opening, the piston rods of the pistons being guided in the vacuum area of the valve and forming tappets which press the valve disk against the valve seat in the closed position of the valve disk. This increases the closing force that can be applied. But the closing force that can be applied by these pistons is limited due to their small dimensions. However, depending on the differential pressure acting on the valve disk and the size of the valve disk, comparatively large closing forces may be required which cannot be achieved in this construction under certain circumstances.

US 2004/0079915 A1 describes, among others, a vacuum valve in the form of a pendulum valve. In this case, a carrying plate carrying a valve plate and a supporting plate is arranged at the swivelable carrying arm. The valve plate and the supporting plate are adjustable relative to the carrying plate in axial direction of the inlet opening and outlet opening of the valve housing by means of piston-cylinder units. The sealed state of the vacuum valve is brought about in that the valve plate presses against the valve seat surrounding the inlet opening and the supporting plate presses against the valve housing in the area of the outlet opening. A plurality of pistons are provided in the piston spaces of the carrying plate for displacing the valve plate relative to the carrying plate. The construction of this vacuum valve is relatively uneconomical on the whole. The constructional variant in which the supporting plate is omitted is also mentioned. In this case, the closing force for pressing the valve plate against the valve seat must be transmitted via the carrying arm of the valve plate. Therefore, the closing force that can be applied is limited, or the carrying arm must be correspondingly massive.

U.S. Pat. No. 6,561,482 B2 also shows, among others, constructional variants in the form of pendulum valves. In this case, the valve plate is again held by a carrying plate fastened to the carrying arm, and the carrying plate is provided with a piston-cylinder unit, the valve plate being arranged at the piston rod thereof. The valve plate can be pressed against the valve seat by means of this piston. A bellows seal is arranged between the valve plate and the carrying plate, and openings which open into the space between the valve plate and carrying plate are provided in the valve plate. A pressure balance can be achieved between the two sides of the valve plate through these openings. The construction of this valve is uneconomical and the structural height in axial direction of the valve opening is relatively large. This publication further describes an embodiment form constructed as a slide valve in which a supporting plate is held at the valve plate by means of a piston-cylinder unit. In the sealed state of the valve, the supporting plate is pressed against the stops of the valve housing which are arranged in the area surrounding the outlet opening. The valve plate is accordingly pressed against the valve seat. In this case, the movement of the valve plate must be absorbed by a sufficient elasticity of the valve rod. Also, the closing force that can be applied is comparatively small, and differential pressures are again compensated by a bellows seal between the supporting plate and the openings opening into the space between the supporting plate and valve plate.

OBJECT AND SUMMARY OF THE INVENTION

It is the primary object of the invention to provide a vacuum valve of the type mentioned above which is constructed in a simple manner and in which a high closing force (contact pressing force) can be applied.

According to the invention, this object is met by a vacuum valve comprising a valve housing which has an inlet opening and an outlet opening penetrating opposite walls of the valve housing, a valve seat surrounding the inlet opening, a valve disk which is located in the interior space of the valve housing and which is arranged at a carrying arm that is rigidly connected to a shaft which, for purposes of opening and closing the vacuum valve, is rotatable around its longitudinal axis and displaceable in axial direction, and a driving device by which the valve disk can be adjusted from a closed position, in which it is pressed against the valve seat, into an open position, in which it releases the inlet opening, by way of an intermediate position in which it is lifted from the valve seat by an axial displacement of the shaft, wherein the driving device comprises a rotary drive for rotating the shaft (8) and further comprises a driving piston which is arranged in an inner cavity of the valve disk and which has, at least over portions of its circumference, a radial extension which is larger than the outlet opening with respect to the center longitudinal axis of the outlet opening and at which tappets are arranged on the side facing the outlet opening, which tappets are guided out of the inner cavity of the valve disk and are supported in the closed position of the valve disk at the valve housing in the area next to the outlet opening and press the valve disk against the valve seat and which can be lifted from the valve housing for displacing the valve disk from its closed position into its intermediate position by means of a displacement of the driving piston, wherein at least one spring element displaces the valve disk into its intermediate position by means of an axial displacement of the shaft.

A high closing force can be achieved by means of the driving piston which is arranged in the valve disk and which has a large dimensioning. The closing force is transmitted to the valve housing in a direct path via the tappets. This results in a simple construction and efficient transmission of force.

The driving piston can be acted upon by springs in the direction in which the tappets are pressed against the valve housing so that the closing force is also applied without applying a pressure medium to the driving piston. Also, it can be provided that the driving piston is acted upon by a spring in the direction in which the tappets lift from the valve housing. Further, a double-action driving piston, i.e., acted upon on both sides by pressure medium, can be provided.

In an advantageous embodiment form of the invention, the inlet opening and the outlet opening are circular in shape and are arranged coaxial to one another. In an advantageous manner, the valve disk and the driving piston can also be circular in shape viewed from the front and are arranged coaxial to the inlet opening and outlet opening.

Further advantages and details of the invention are described in the following with reference to the accompanying drawings which also present further objects of the invention.

BRIEF DESCRIPTION OF THE DRAWINGS

In the drawings:

FIG. 3 shows a section along line B-B of FIG. 2;

FIG. 4 shows a section corresponding to FIG. 3, but in the open position of the valve disk;

DESCRIPTION OF THE PREFERRED EMBODIMENT EXAMPLES

Figure 1:
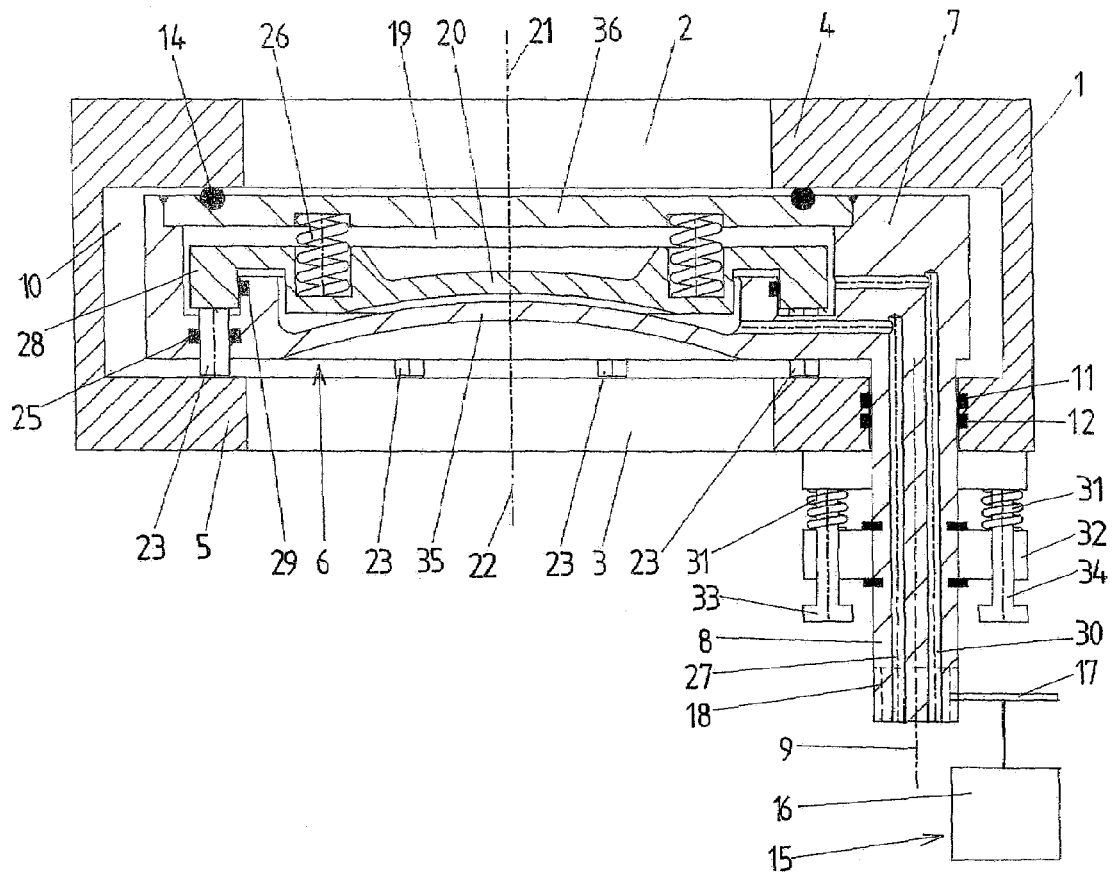
FIG. 1 shows a schematic view of a vacuum valve according to the invention in the closed position of the valve disk, in section through the valve housing.

FIGS. 1 to 4 show a first embodiment form of the invention schematically. The vacuum valve comprises a valve housing 1 which is provided with an inlet opening 2 and an outlet opening 3 which penetrate opposite walls 4, 5 of the valve housing. The center longitudinal axes 21, 22 of the inlet opening 2 and outlet opening 3 lie parallel to one another. In the present embodiment example, the inlet opening 2 and the outlet opening 3 have a circular shape, preferably lie coaxial to one another and have the same diameter.

A valve disk 6 which is rigidly connected to a swivelable carrying arm 7 is located in the interior space 10 of the valve housing 1. The carrying arm 7 is in turn rigidly connected to a shaft 8 which is mounted so as to be rotatable around its longitudinal axis 9 and displaceable in axial direction. The longitudinal axis 9 of the shaft 8 lies parallel to the center longitudinal axes 21, 22 of the inlet opening 2 and outlet opening 3.

The shaft 8 is guided out of the interior space 10 of the valve housing by a rotary-slide feedthrough. This rotary-slide feedthrough is formed, for example, by two sealing rings 11, 12 contacting an outer sealing surface of the shaft 8.

In the sealed state of the vacuum valve, the valve disk 6 is pressed against a valve seat 13 of the valve housing 1 which surrounds the inlet opening 2. In the present embodiment example, the valve seat 13 is formed by a sealing surface at the inner surface of the wall 4 of the valve housing 1, and a sealing ring 14 cooperating with this sealing surface is arranged at the valve disk 6. It is also conceivable and possible to arrange a sealing ring at the valve seat 13 and to provide the valve disk 6 with a sealing surface cooperating with the sealing ring.

The vacuum valve can be opened and closed by means of a driving device which will be described in the following. In the closed and sealed state of the vacuum valve, the valve disk 6 is in its closed position in which it is pressed by the driving device against the valve seat 13 by a closing force (contact pressing force) (see FIG. 1). To open the vacuum valve, the valve disk 6 is initially lifted from the valve seat 13 in axial direction of the inlet opening 2 or shaft 8. This intermediate position in which the valve disk 6 is lifted from the valve seat 13 but the inlet opening 2 is still covered (viewed in axial direction of the inlet opening 2) is shown in FIGS. 2 and 3. Subsequently, by the rotation of the shaft 8 around its longitudinal axis 9, the valve disk 6 is swiveled into its open position in which it releases the inlet opening 2 (see FIG. 4). To close the valve, this process is carried out in the reverse sequence.

Figure 2:
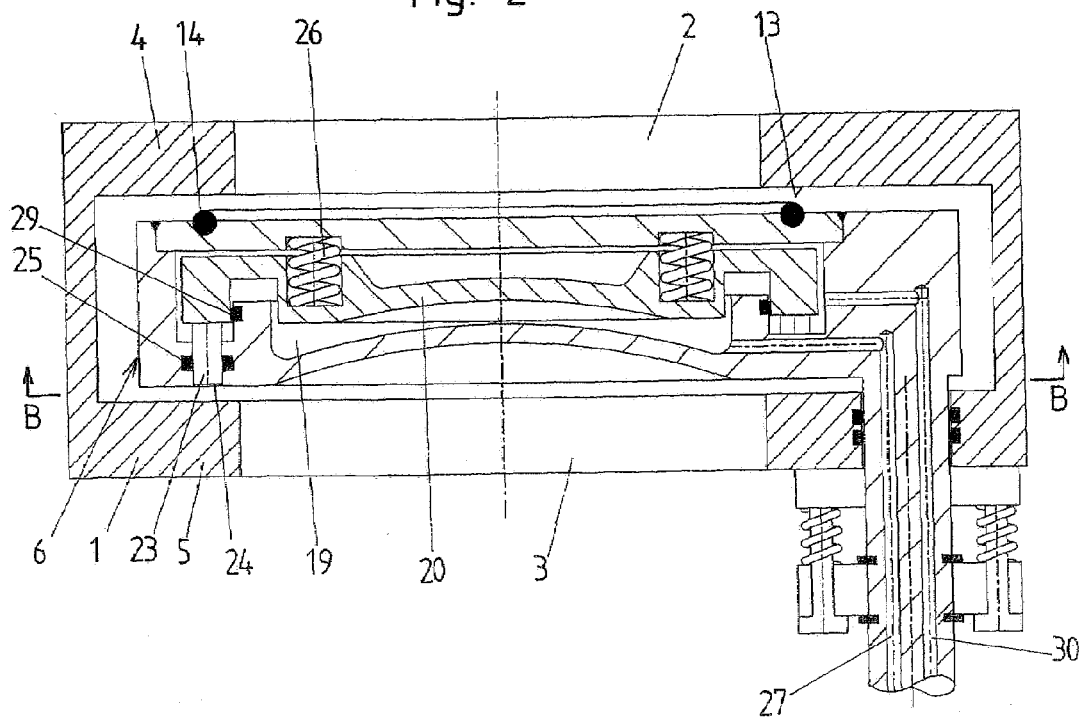
FIG. 2 shows a section corresponding to FIG. 1 in the intermediate position of the valve disk (without the rotary drive), section line A-A of FIG. 3.

The driving device for opening and closing the vacuum valve comprises a rotary drive 15 for rotating the shaft 8 which is only shown schematically in FIG. 1. In this embodiment form, which is shown schematically, the rotary drive 15 has a driving motor 16, a toothed wheel 17 which meshes with the external toothing 18 of the shaft 8 being rotatable by means of this driving motor 16. Rotary drives for rotating the shaft of a pendulum valve are known in various embodiment forms.

Further, the driving device comprises a driving piston 20 which is arranged in an inner cavity 19 of the valve disk 6 and which can preferably be actuated pneumatically. This driving piston 20 is displaceable in the inner cavity 19 in axial direction of the inlet opening and outlet opening and shaft 8. In the present embodiment example, the driving piston 20 is circular in shape viewed from the front (in axial direction of the inlet opening 2 and outlet opening 3 or in axial direction of the shaft 8) and is arranged coaxial to the outlet opening 3. It has a larger diameter than the outlet opening 3. Accordingly, in the present embodiment example, the driving piston 20 has a greater radial extension (away from the center longitudinal axis 22) along its entire circumference with reference to the center longitudinal axis 22 of the outlet opening 3 than the outlet opening 3. In the area of the driving piston 20 that extends farther radially outward than the outlet opening 3, tappets 23 are arranged at the driving piston 20 on the side directed toward the outlet opening 3. A plurality of tappets 23 are arranged in the area of the circumferential edge of the driving piston 20 and are spaced apart from one another, preferably equidistantly, in circumferential direction of the driving piston 20.

These tappets 23 which lie parallel to the center longitudinal axis 22 of the outlet opening 3 and parallel to the longitudinal axis 9 of the shaft 8 are guided out of the inner cavity 19 of the valve disk 6 through openings and are supported in the closed position by their free ends 24 at the wall 5 of the valve housing 1 in the area next to the outlet opening 3.

For example, the tappets 23 have end portions with external threads and are screwed into blind holes having internal threads (threaded bore holes) of the driving piston 20.

The tappets 23 are preferably guided out of the inner cavity 19 in a sealed manner. To this end, sealing rings 25 cooperating with external sealing surfaces of the tappets 23 can be arranged, for example, in the openings from which the tappets 23 are guided out.

To prevent metal-on-metal contact, the free ends 24 of the tappets and/or the areas of the valve housing 1 at which the free ends 24 of the tappets 23 make contact can be provided with plastic parts.

Springs 26 which bias the driving piston 20 in direction of one of its end positions are arranged between the driving piston 20 and the valve disk 6. The driving piston 20 can be acted upon by compressed air in order to displace the driving piston 20 into its other end position against the force of the spring 26.

The supply of compressed air for acting upon the driving piston 20 is carried out through a channel 27 which extends through the shaft 8 and the carrying arm 7 and opens into the inner cavity 19 of the valve disk 6. The portion of the inner cavity 19 into which the channel 27 opens is sealed from the other portion located on the opposite side of the driving piston 20. In the present embodiment example, an annular groove is formed in the inner cavity 19, an annular protuberance 28 of the driving piston 20 projecting into this annular groove. A sealing ring 29 which cooperates with the wall of the protuberance 28 is arranged in the area of the wall of the annular groove.

A channel 30 which extends through the carrying arm 7 and the shaft 8 opens into the other portion of the inner cavity 19 of the valve disk 6. This channel 30 is connected to the atmosphere. Also, it is conceivable and possible to connect the channel 30 to a pump. Accordingly, this portion of the inner cavity 19 which communicates with atmospheric pressure or is pumped off prevents a vacuum from acting upon the sealing rings 25 sealing the tappets 23 relative to the valve disk 6 when compressed air passes through the sealing ring 29.

In the completely closed state of the vacuum valve when the valve disk 6 is in its closed position, the tappets 23 are pressed against the valve housing 1 in the area next to the outlet opening 3 by the force of the springs 26 so that the valve disk 6 is pressed against the valve seat 13. The closing force is accordingly applied by the springs 26 which must be designed with corresponding strength for this purpose.

In the present embodiment example, the springs 26 must also overcome the force of the spring elements 31 acting on the shaft 8 and, therefore, on the valve disk 6 with a spring force acting in opposition to the force of the springs 26.

When compressed air is admitted through the channel 27, this causes the driving piston 20 to be displaced against the force of the springs 26 so that the tappets 23 are drawn back further in the direction of the inner cavity 19 of the valve disk 6. The spring elements 31 which in the present embodiment example act between the valve housing 1 and a ring 32 that is penetrated by the shaft 8 and connected thereto so as to be rotatable but not axially displaceable cause an axial displacement of the shaft 8 by means of which the valve disk 6 lifts from the valve seat in axial direction of the shaft 8 or inlet opening 2. This takes place until the ring 32 contacts stops 33 which are formed in this instance by enlarged heads of pins 34 which are arranged at the valve housing 1 and penetrate the ring 32 through openings in such a way that the ring 32 is axially displaceable relative to the pins 34. The spring elements 31 are constructed as coil springs arranged on the pins 34.

The intermediate position of the valve disk 6 in which it is lifted from the valve seat 13 is shown in FIGS. 2 and 3. In so doing, the tappets 23 are lifted from the valve housing 1.

Subsequently, the shaft 8 is rotated by the rotary drive 15 to swivel the valve disk 6 into its open position. This process is carried out in reverse for closing the valve.

When the shaft 8 is displaced axially, the toothed wheel 17 is displaced in the external toothing 18.

Servicing of the seals 25 for the tappets 23 can be carried out in a simple manner by unscrewing the tappets 23 from the threaded bore holes of the valve disk 6.

Figure 5:
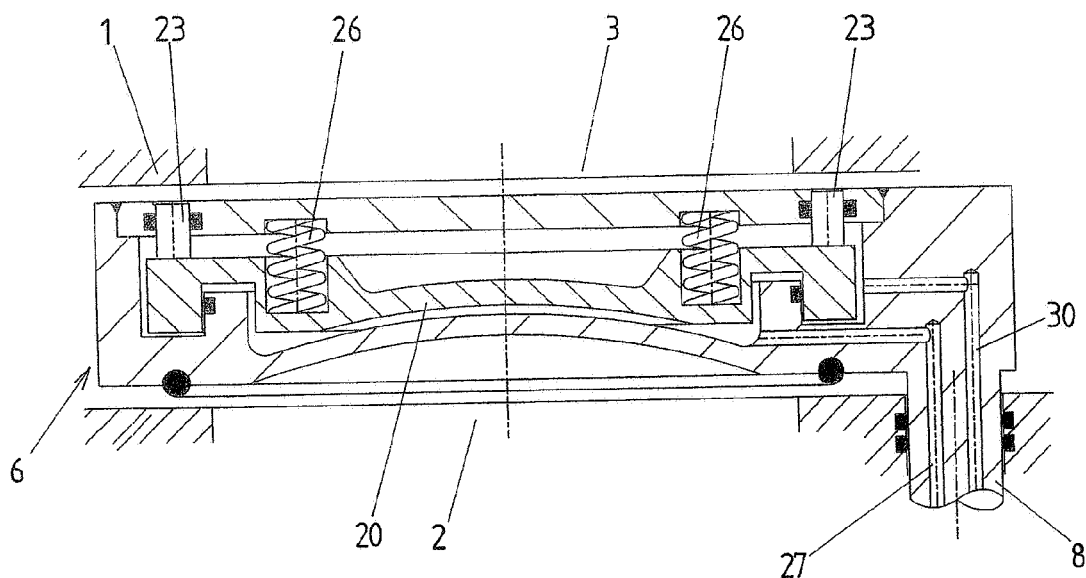
FIG. 5 shows a schematic section through a portion of a vacuum valve according to a second constructional variant of the invention.

In the embodiment example according to FIG. 5, in which the valve disk 6 is shown in its intermediate position, the springs 26 act so as to draw the tappets 23 inward in direction of the inner cavity 19 of the valve disk 6. The channel 27 must be acted upon by compressed air to move the valve disk 6 into its closed position, whereupon the valve disk 6 is displaced against the force of the springs so that the tappets 23 are moved out and contact the inner surface of the valve housing 1 in an area surrounding the outlet opening 3 and press the valve disk in direction of the valve seat 13 and against the latter (again against the force of spring elements 31 which act upon the shaft 8, not shown in FIG. 5).

Between the portion of the inner cavity 19 of the valve disk 6 and the seals for the feedthrough of the tappets 23, there is another portion of the inner cavity 19 of the valve disk 6 which is connected to the atmosphere via a channel 30 or is pumped out.

Figure 6:
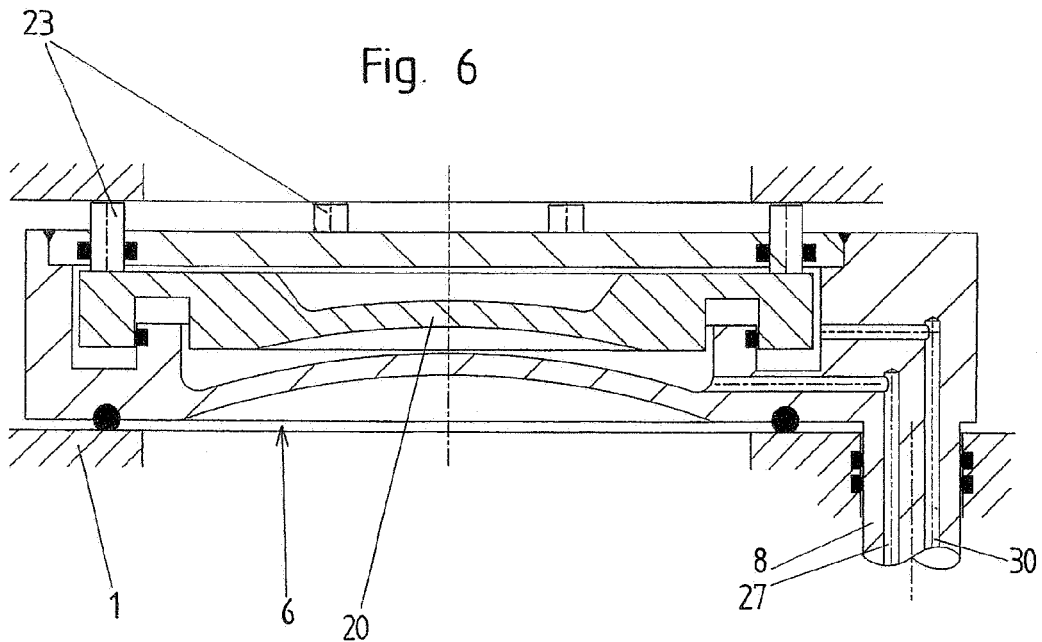
FIG. 6 shows a schematic section through a portion of the vacuum valve according to a third constructional variant of the invention.

In the embodiment example according to FIG. 6, the driving piston 20 is constructed as a double-action driving piston 20. For displacing between the closed position and the intermediate position, the corresponding channel 27, 30 opening into one of the two cylinder spaces for the driving piston 20 is acted upon by compressed air.

In the present embodiment examples, the valve disk 6 is constructed in two parts with a cup-shaped bottom part 35 and a cover 36, these two parts being welded together, for example. It is also conceivable and possible to produce connections by other means, for example, by screws, in which case a sealing ring is arranged between the bottom part 35 and the cover 36.

The carrying arm 7 and a portion of the valve disk 6, for example, a cup-shaped bottom portion 35 of the valve disk 6, can be formed integral with one another as is shown in the drawings. An integral construction of the carrying arm 7 and shaft 8 is also conceivable and possible.

Various other modifications of the embodiment examples shown herein are conceivable and possible without departing from the scope of the invention. For example, the inlet opening 2 and outlet opening 3 could have a shape other than circular. The valve disk 6 and the driving piston 20 arranged therein could then be constructed with a correspondingly adapted circumferential contour.

It is also conceivable and possible that the driving piston 20 has a different contour than the outlet opening 3 and has a greater radial extension than the outlet opening 3 away from the center longitudinal axis 22 of the outlet opening 3 over only some of its circumference. The tappets 23 would then have to be arranged in these portions of the driving piston 20 in which it overlaps in axial direction of the outlet opening 3 with the wall 5 of the valve housing 1 adjoining the outlet opening 3.

As follows from the preceding description, the range of the invention is not limited to the embodiment examples shown herein, but rather should be defined with reference to the appended claims together with their full range of possible equivalents. While the preceding description and drawings show the invention, it is obvious to a person skilled in the art that various modifications can be carried out without departing from the spirit of and field of the invention.

REFERENCE NUMBERS:

| | |
|---|---|
| 1 | valve housing |
| 2 | inlet opening |
| 3 | outlet opening |
| 4 | wall |
| 5 | wall |
| 6 | valve disk |
| 7 | carrying arm |
| 8 | shaft |
| 9 | longitudinal axis |
| 10 | interior space |
| 11 | sealing ring |
| 12 | sealing ring |
| 13 | valve seat |
| 14 | sealing ring |
| 15 | rotary drive |
| 16 | drive motor |
| 17 | toothed wheel |
| 18 | external toothing |
| 19 | inner cavity |
| 20 | driving piston |
| 21 | center longitudinal axis |
| 22 | center longitudinal axis |
| 23 | tappet |
| 24 | free end |
| 25 | sealing ring |
| 26 | spring |
| 27 | channel |
| 28 | protuberance |
| 29 | sealing ring |
| 30 | channel |
| 31 | spring element |
| 32 | ring |
| 33 | stop |
| 34 | pin |
| 35 | bottom part |
| 36 | cover |

What is claimed is:

1. A vacuum valve comprising:
a valve housing which has an inlet opening and an outlet opening penetrating opposite walls of the valve housing;
a valve seat surrounding the inlet opening;
a valve disk being located in the interior space of the valve housing and being arranged at a carrying arm that is rigidly connected to a shaft;
said shaft for purposes of opening and closing the vacuum valve, being rotatable around its longitudinal axis and displaceable in axial direction;
a driving device by which the valve disk can be adjusted from a closed position, in which it is pressed against the valve seat, into an open position, in which it releases the inlet opening, by way of an intermediate position in which it is lifted from the valve seat by an axial displacement of the shaft;
said driving device comprising a rotary drive for rotating the shaft and further comprising a driving piston being arranged in an inner cavity of the valve disk and having, at least over portions of its circumference, a radial extension which is larger than the outlet opening with respect to the center longitudinal axis of the outlet opening and at which tappets are arranged on the side facing the outlet opening;
said tappets being guided out of the inner cavity of the valve disk and being supported in the closed position of the valve disk at the valve housing in the area next to the outlet opening and pressing the valve disk against the valve seat and which can be lifted from the valve housing for displacing the valve disk from its closed position into its intermediate position by a displacement of the driving piston; and
at least one spring element displacing the valve disk into its intermediate position by an axial displacement of the shaft.

2. The vacuum valve according to claim 1, wherein the inlet opening and the outlet opening are circular in shape and are arranged coaxial to one another.

3. The vacuum valve according to claim 2, wherein the valve disk is circular in shape viewed in axial direction of the inlet opening.

4. The vacuum valve according to claim 3, wherein the driving piston is circular in shape viewed in axial direction of the outlet opening.

5. The vacuum valve according to claim 1, wherein the tappets are arranged in the area of the circumferential edge of the driving piston and are spaced apart from one another in circumferential direction of the driving piston.

6. The vacuum valve according to claim 1, wherein the tappets have external threads by which they are screwed into threaded bore holes of the driving piston.

7. The vacuum valve according to claim 1, wherein the driving piston can be actuated pneumatically.

8. The vacuum valve according to claim 7, wherein the driving piston is biased in direction of one of its end positions by springs.

9. The vacuum valve according to claim 8, wherein, between the portion of the inner cavity of the valve disk, which is acted upon by compressed air for the displacement of the driving piston against the force of the at least one spring, and the sealed feedthroughs for guiding the tappets out of the inner cavity of the valve disk, there is a portion of the inner cavity which is sealed relative to the portion of the inner cavity acted upon by pressure and which is connected to the atmosphere or evacuated via a channel.

* * * * *